United States Patent
Peranandam et al.

(10) Patent No.: US 11,455,538 B2
(45) Date of Patent: Sep. 27, 2022

(54) CORRECTNESS PRESERVING OPTIMIZATION OF DEEP NEURAL NETWORKS

(71) Applicant: GM GLOBAL TECHNOLOGY OPERATIONS LLC, Detroit, MI (US)

(72) Inventors: Prakash Mohan Peranandam, Rochester Hills, MI (US); Ramesh Sethu, Troy, MI (US); Alena Rodionova, Philadelphia, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 951 days.

(21) Appl. No.: 16/227,195

(22) Filed: Dec. 20, 2018

(65) Prior Publication Data

US 2020/0202214 A1 Jun. 25, 2020

(51) Int. Cl.
*G06N 3/08* (2006.01)
*G06K 9/62* (2022.01)
*G06N 3/04* (2006.01)

(52) U.S. Cl.
CPC .......... *G06N 3/082* (2013.01); *G06K 9/6262* (2013.01); *G06N 3/04* (2013.01)

(58) Field of Classification Search
CPC ............................. G06N 3/082; G06V 20/58
See application file for complete search history.

(56) References Cited

U.S. PATENT DOCUMENTS

2019/0197406 A1\* 6/2019 Darvish Rouhani .. G06N 20/00

OTHER PUBLICATIONS

B. Zhang, A. Davoodi, and Y. H. Hu, "Exploring energy and accuracy tradeoff in structure simplification of trained deep neural networks," IEEE Journal on Emerging and Selected Topics in Circuits and Systems, vol. 8, No. 4, pp. 836-848, Print Pub Date: May 3, 2018, E-Pub Date: Dec. 17, 2018. (Year: 2018).\*

\* cited by examiner

*Primary Examiner* — Ross Varndell
(74) *Attorney, Agent, or Firm* — Lorenz & Kopf LLP

(57) ABSTRACT

A method for reducing the number of neurons in a trained deep neural network (DNN) includes classifying layer types in a plurality of hidden layers; evaluating the accuracy of the DNN using a validation set of data; and generating a layer specific ranking of neurons, wherein the generating includes: analyzing, using the validation set of data for one or more of the plurality of hidden layers, the activation function for each neuron in the analyzed layers to determine an activation score for each neuron; and ranking, on a layer type basis, each neuron in the analyzed layers based on the neuron's activation score to generate a layer specific ranking of neurons. The method further includes removing a number of lower ranked neurons from the DNN that does not result in the DNN after the removal of selected lower ranked neurons to fall outside of an accuracy threshold limit.

20 Claims, 8 Drawing Sheets

CORRECTNESS PRESERVING OPTIMIZATION OF DEEP NEURAL NETWORKS

BACKGROUND

The present disclosure relates generally to deep neural networks (DNNs) and more specifically to a DNN optimization methodology that eliminates neurons through neuron analysis to reduce computing power and resource requirements of a trained DNN while balancing accuracy requirements.

A deep neural network (DNN) can be used in a vehicle, such as an autonomous vehicle, for numerous systems such as perception systems. A vehicle perception system may allow a vehicle to sense objects and obstacles in the road on which the vehicle travels. A trained DNN may require a large amount of computing power and memory. A vehicle may not have unlimited computing power and memory to devote to a trained DNN.

Accordingly, it is desirable to provide a methodology for reducing the computing resource and power requirements of a trained deep neural network. Furthermore, other desirable features and characteristics of the present invention will become apparent from the subsequent detailed description of the invention and the appended claims, taken in conjunction with the accompanying drawings and the background of the invention.

SUMMARY

A processor-implemented method for reducing the number of neurons and their interconnections in a trained deep neural network (DNN) used in a vehicle is provided. The method includes identifying and classifying layer types in a plurality of hidden layers of the DNN; evaluating the accuracy of the DNN using a validation set of data; and generating a layer specific ranking of neurons, wherein the generating includes: analyzing, using the validation set of data for one or more of the plurality of hidden layers, the activation function for each neuron in the analyzed one or more layers to determine an activation score for each neuron corresponding to an analyzed activation function; and ranking, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score. The method further includes selecting a number of lower ranked neurons of a specific type from the DNN for removal that does not result in the DNN after the removal of selected lower ranked neurons to fall outside of an accuracy threshold limit; and removing the neurons selected for removal from the DNN; wherein the DNN with the removed neurons is configured to perform perception tasks in a vehicle.

In one embodiment, the layer types in the hidden layers include fully connected layers and convolutional layers.

In one embodiment, the selecting a number of lower ranked neurons from the DNN for removal includes iteratively analyzing and selecting lower ranked neurons from the DNN for removal until an iteration threshold is met.

In one embodiment, the iteratively selecting lower ranked neurons from the DNN for removal includes: designating some of the lower ranked neurons for removal; comparing the accuracy of a newer DNN with the lower ranked neurons designated for removal removed to the DNN without neurons removed; when the accuracy of the newer DNN is not within accuracy threshold limits, performing another iteration of the selecting while designating fewer neurons for removal if an iteration limit has not been met or selecting for removal the neurons designated for removal from the latest prior iteration wherein the accuracy of the newer DNN was within accuracy threshold limits if the iteration limit has been met; and when the accuracy of the newer DNN is within accuracy threshold limits, performing another iteration of the selecting while designating more neurons for removal if an iteration limit has not been met or selecting for removal the neurons designated for removal in the current iteration if the iteration limit has been met.

In one embodiment, evaluating the accuracy of the DNN includes applying the validation set of data to the inputs of the DNN and determining the prediction accuracy at the outputs of the DNN.

In one embodiment, comparing the accuracy of the newer DNN to the DNN without neurons removed includes determining the accuracy of the newer DNN by applying the validation set of data to the inputs of the newer DNN and determining the prediction accuracy at the outputs of the newer DNN.

In one embodiment, the method further includes determining whether the accuracy of the newer DNN is within threshold limits by comparing the prediction accuracy at the outputs of the newer DNN to the prediction accuracy at the outputs of the DNN without neurons removed.

In one embodiment, determining the prediction accuracy at the outputs of the DNN includes determining the prediction accuracy of the top-1 prediction at the outputs of the DNN and the prediction accuracy of the top-5 predictions at the outputs of the DNN.

In one embodiment, the designating some of the lower ranked neurons for removal includes identifying the lowest ranked neurons that fall within a predetermined neuron reduction limit and designating for elimination neurons in the lowest ranked neurons that fall within the predetermined neuron reduction limit.

In one embodiment, the designating some of the lower ranked neurons for removal includes identifying the lowest ranked neurons that fall within a predetermined neuron reduction limit and designating for elimination neurons in the lower half of the lowest ranked neurons that fall within the predetermined neuron reduction limit.

In one embodiment, the designating some of the lower ranked neurons for removal includes only designating neurons in fully connected layers for removal. A separate ranking evaluation is done and similar iterative removal procedure can be applied to other layer types.

In one embodiment, the method further includes retraining the DNN with the removed neurons using a data training set used to train the DNN before the removal of neurons.

In another embodiment, a vehicle perception system including one or more processors configured by programming instructions on non-transient computer readable media to implement a trained deep neural network (DNN) with removed neurons is provided. The DNN is configured by a processing system configured to: identify and classify layer types in a plurality of hidden layers of the DNN; evaluate the accuracy of the DNN using a validation set of data; and generate a layer specific ranking of neurons. To generate, the processing system is configured to: analyze, using the validation set of data for one or more of the plurality of hidden layers, the activation function for each neuron in the analyzed one or more layers to determine an activation score for each neuron corresponding to an analyzed activation function; and rank, on a layer type basis, each neuron in the analyzed one or more layers based on the activation score for the neuron to generate a layer specific ranking of neurons, wherein the ranking includes generating a normalized neuron activation output score for each neuron and ranking the neurons in a layer based on its normalized activation output score. The processing system is further configured to select a number of lower ranked neurons from the DNN for removal that does not result in the DNN after the removal of selected lower ranked neurons to fall outside of an accuracy threshold limit; and remove the neurons selected for removal from the DNN, wherein the DNN with the removed neurons is configured to perform perception tasks in a vehicle.

The vehicle perception system of claim 13, wherein to select a number of lower ranked neurons from the DNN for removal the processing system is configured to iteratively select lower ranked neurons from the DNN for removal until an iteration threshold is met.

In one embodiment, to iteratively select lower ranked neurons from the DNN for removal the processing system is configured to: designate some of the lower ranked neurons for removal; compare the accuracy of a newer DNN with the lower ranked neurons designated for removal removed to the DNN without neurons removed; when the accuracy of the newer DNN is not within accuracy threshold limits, perform another iteration of the selecting while designating fewer neurons for removal if an iteration limit has not been met or select for removal the neurons designated for removal from the latest prior iteration wherein the accuracy of the newer DNN was within accuracy threshold limits if the iteration limit has been met; and when the accuracy of the newer DNN is within accuracy threshold limits, perform another iteration of the selecting while designating more neurons for removal if an iteration limit has not been met or select for removal the neurons designated for removal in the current iteration if the iteration limit has been met.

In one embodiment, to evaluate the accuracy of the DNN the processing system is configured to apply the validation set of data to the inputs of the DNN and determine the prediction or classification accuracy at the outputs of the DNN.

In one embodiment, to compare the accuracy of the newer DNN to the DNN without neurons removed the processing system is configured to determine the accuracy of the newer DNN by applying the validation set of data to the inputs of the newer DNN and determining the prediction accuracy at the outputs of the newer DNN.

In one embodiment, the processing system is configured to determine whether the accuracy of the newer DNN is within threshold limits by comparing the prediction accuracy at the outputs of the newer DNN to the prediction accuracy at the outputs of the DNN without neurons removed.

In one embodiment, to determine the prediction accuracy at the outputs of the DNN the processing system is configured to determine the prediction accuracy of the top-1 prediction at the outputs of the DNN and the prediction accuracy of the top-5 predictions at the outputs of the DNN.

In one embodiment, to designate some of the lower ranked neurons for removal the processing system is configured to identify the lowest ranked neurons that fall within a predetermined neuron reduction limit and designate for elimination neurons in the lowest ranked neurons that fall within the predetermined neuron reduction limit.

In one embodiment, to designate some of the lower ranked neurons for removal the processing system is configured to identify the lowest ranked neurons that fall within a predetermined neuron reduction limit and designate for elimination neurons in the lower half of the lowest ranked neurons that fall within the predetermined neuron reduction limit.

In one embodiment, to designate some of the lower ranked neurons for removal the processing system is configured to only designate neurons in fully connected layers for removal.

In one embodiment, the processing system is configured to retrain the DNN with the removed neurons on requirement basis using a data training set used to train the DNN before the removal of neurons.

In another embodiment, a processing system including one or processors configured by programming instructions on non-transient computer readable media to reduce the number of neurons in a trained deep neural network (DNN) is provided. The processing system is configured to: identify and classify layer types in a plurality of hidden layers of the DNN; evaluate the accuracy of the DNN using a validation set of data; and generate a layer specific ranking of neurons. To generate the processing system is configured to: analyze, using the validation set of data for one or more of the plurality of hidden layers, the activation function for each neuron in the analyzed one or more layers to determine an activation score for each neuron corresponding to an analyzed activation function; and rank, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score. The processing system is further configured to select a number of lower ranked neurons from the DNN for removal that does not result in the DNN after the removal of selected lower ranked neurons to fall outside of an accuracy threshold limit; and remove the neurons selected for removal from the DNN; wherein the DNN with the removed neurons is configured to perform perception tasks in a vehicle.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques and articles for reducing resource requirements for a trained deep neural network (DNN). The described apparatus, systems, techniques and articles can provide a lean DNN that provides an acceptable balance between performance and accuracy. The described apparatus, systems, techniques and articles can provide a lean DNN with DNN performance and accuracy versus memory and compute power utilization tradeoffs.

Figure 1A:
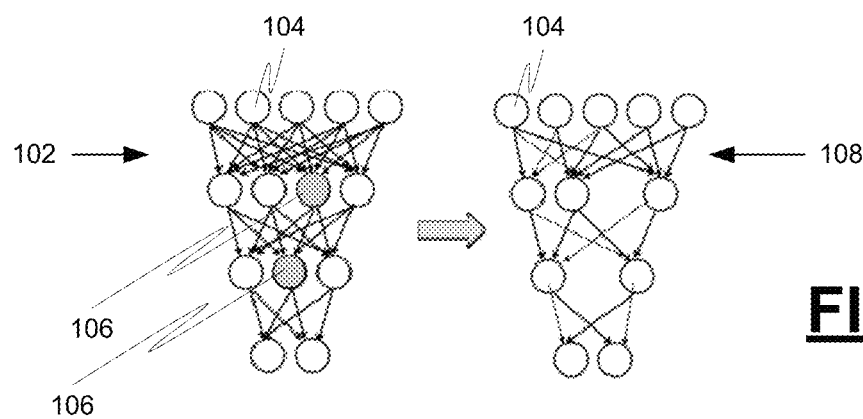
FIG. 1A is a diagram depicting an example trained DNN and an example lean DNN, in accordance with some embodiments.

FIG. 1A is a diagram depicting an example trained DNN 102 with a plurality of interconnected neurons 104. The example trained DNN 102 utilizes deep learning. Deep learning (also known as deep structured learning, hierarchical learning or deep machine learning) is a class of machine learning algorithms that use a cascade of many layers of nonlinear processing units for feature extraction and transformation. Each successive layer uses the output from the previous layer as input. The example DNN 102 is a computing system or processing device that is made up of a number of simple, highly interconnected processing elements/devices/units referred to as neurons 104, which can be implemented using software algorithms and/or actual hardware. The example DNN 102 is organized in layers that are made up of a number of interconnected neurons 104 that work together to produce an output.

In many environments, such as a vehicle, computational resources, e.g., memory and computational power, may be limited. The use of DNNs can put a strain on computational resources. Some neurons 106, however, are less critical than other neurons 104 in producing an output in a DNN. The subject matter described herein discloses apparatus, systems, techniques and articles for eliminating less critical neurons 106 from a trained DNN 102 to produce a lean DNN 108 with the less critical neurons 106 eliminated. The described apparatus, systems, techniques and articles provide for reducing the number of neurons in a DNN to generate a lean DNN 108 that will execute with lower memory and computational power requirements than the original DNN 102 while achieving similar performance. The lean DNN 108 is configured to meet accuracy requirements but its resource requirements are reduced compared to that of the original trained DNN 102. This can be accomplished by trading off some accuracy for reduced resource requirements.

Figure 1B:
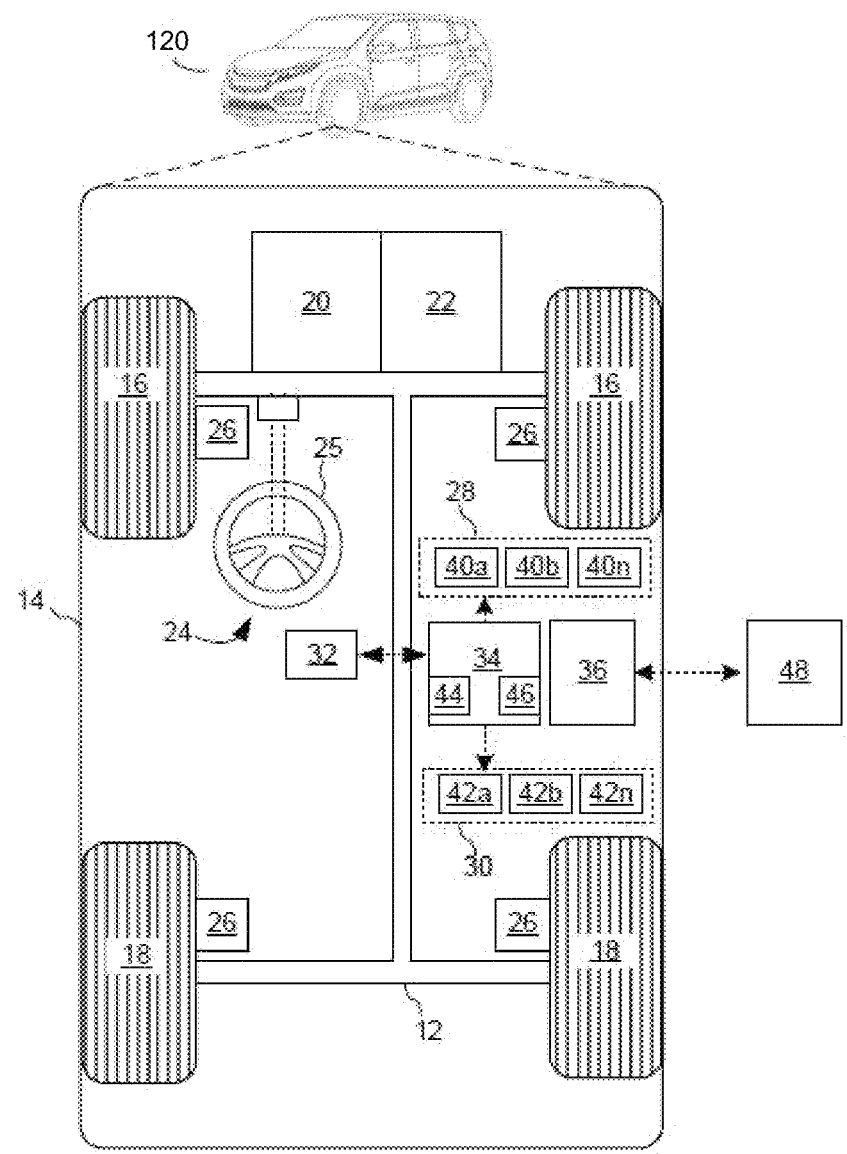
FIG. 1B is a block diagram depicting an example vehicle, in accordance with some embodiments.

FIG. 1B is a block diagram of an example vehicle 120 that employs a lean DNN 108. The example vehicle 120 generally includes a chassis 12, a body 14, front wheels 16, and rear wheels 18. The body 14 is arranged on the chassis 12 and substantially encloses components of the vehicle 120. The body 14 and the chassis 12 may jointly form a frame. The wheels 16-18 are each rotationally coupled to the chassis 12 near a respective corner of the body 14.

The example vehicle 120 may be an autonomous vehicle (e.g., a vehicle that is automatically controlled to carry passengers from one location to another), a semi-autonomous vehicle or a passenger-driven vehicle. In any case, a lean DNN 108 is incorporated into the example vehicle 120. The example vehicle 120 is depicted as a passenger car but may also be another vehicle type such as a motorcycle, truck, sport utility vehicle (SUV), recreational vehicles (RV), marine vessel, aircraft, etc.

The example vehicle 120 includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios.

The sensor system 28 includes one or more sensing devices 40a-40n that sense observable conditions of the exterior environment and/or the interior environment of the vehicle 120 (such as the state of one or more occupants) and generate sensor data relating thereto. Sensing devices 40a-40n might include, but are not limited to, radars (e.g., long-range, medium-range-short range), lidars, global positioning systems (GPS), optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 120 may also include interior and/or exterior vehicle features not illustrated in FIG. 1, such as various doors, a trunk, and cabin features such as air, music, lighting, touch-screen display components (such as those used in connection with navigation systems), and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 120. In various embodiments, controller 34 is configured to implement a lean DNN 108 as discussed in detail below.

The controller 34 may implement a lean DNN 108. That is, suitable software and/or hardware components of controller 34 (e.g., processor 44 and computer-readable storage device 46) are utilized to provide a lean DNN 108 that is used in conjunction with vehicle 120.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for controlling the components of the vehicle 120, and generate control signals that are transmitted to the actuator system 30 to automatically control the components of the vehicle 120 based on the logic, calculations, methods, and/or algorithms. Although only one controller 34 is shown in FIG. 1, embodiments of the vehicle 120 may include any number of controllers 34 that communicate over a suitable communication medium or a combination of communication mediums and that cooperate to process the sensor signals, perform logic, calculations, methods, and/or algorithms, and generate control signals to automatically control features of the vehicle 120.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
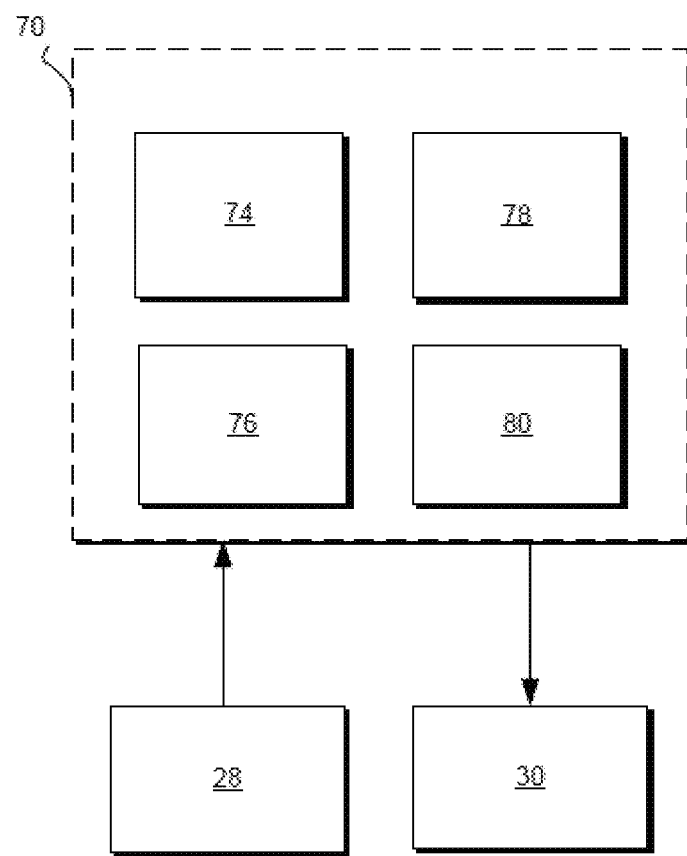
FIG. 2 is a block diagram depicting an example autonomous driving system for a vehicle, in accordance with some embodiments.

In accordance with various embodiments, controller 34 may implement an autonomous driving system (ADS) 70 as shown in FIG. 2. That is, suitable software and/or hardware components of controller 34 (e.g., processor 44 and computer-readable storage device 46) may be utilized to provide an autonomous driving system 70 that is used in conjunction with vehicle 120.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 120. In various embodiments, the perception system 74 can incorporate information from multiple sensors (e.g., sensor system 28), including but not limited to cameras, lidars, radars, and/or any number of other types of sensors. The example perception system 74 can perform the multiple on-board sensing tasks concurrently in a neural network using deep learning algorithms that are encoded in the computer readable media and executed by the one or more processors. Example on-board sensing tasks performed by the example perception system 74 may include object detection, free-space detection, and object pose detection. Other systems in the vehicle 120 may use outputs from the on-board sensing tasks performed by the example perception system 74 to estimate current and future world states to assist with operation of the vehicle 120, for example, in an autonomous driving mode or semi-autonomous driving mode. In various embodiments, a lean DNN 108 is included within the perception system 74.

The positioning system 76 processes sensor data along with other data to determine a position (e.g., a local position relative to a map, an exact position relative to a lane of a road, a vehicle heading, etc.) of the vehicle 120 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 120 to follow. The vehicle control system 80 generates control signals for controlling the vehicle 120 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like. The controller 34 may implement a lean DNN 108 to assist the functionality of the controller 34.

Figure 3:
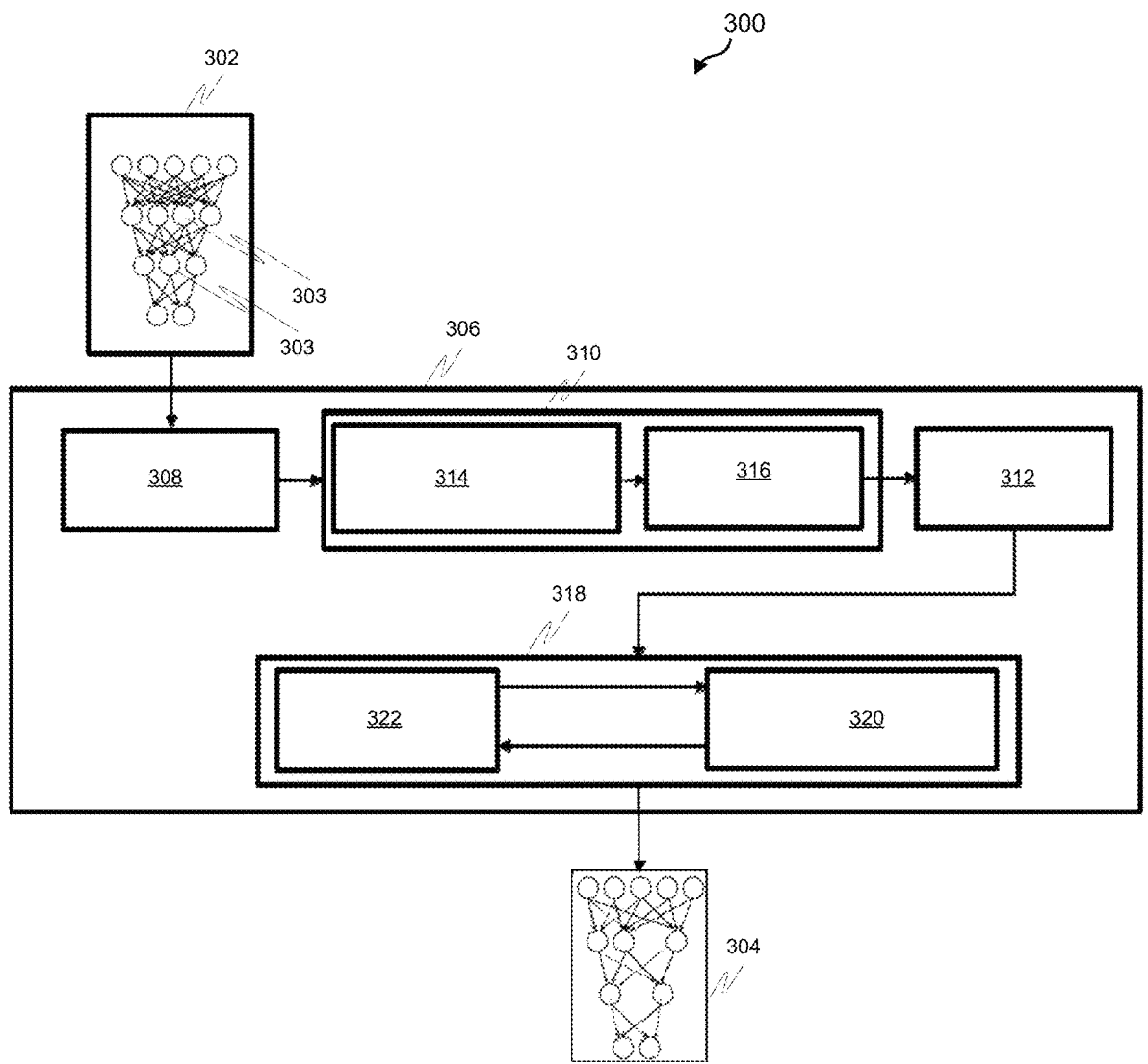
FIG. 3 is a block diagram depicting an example system for reducing the complexity or number of neurons of a trained DNN, in accordance with some embodiments.

FIG. 3 is a block diagram depicting an example system 300 for reducing the complexity or number of neurons of a trained DNN 302 that is implemented via a controller. The example system is configured to strategically select non-critical neurons 303 to eliminate from the DNN 302 to produce a lean DNN 304 with non-critical neurons eliminated. The system selects neurons to eliminate that will have low impact on the accuracy of the lean DNN 304. The lean DNN 304 with non-critical neurons eliminated will execute with lower memory and computational power requirements than the DNN 302 without neurons eliminated while achieving similar performance. This can be accomplished by trading off some accuracy for reduced resource requirements. This can be helpful when the lean DNN 304 is used in a n environment that has limited memory and computational power, such as in a vehicle. For example a vehicle perception system may be implemented using a lean DNN 304 with non-critical neurons eliminated.

The example system 300 includes a processing system 306 comprising one or more processors configured by programming instructions on non-transient computer readable media. The processing system 306 includes a layer classification module 308 that is configured to identify and classify layer types in a plurality of hidden layers of the DNN 302 and a neuron ranking module 310 that is configured to, based on the layer classification, rank neurons based on their importance in performing DNN tasks to produce a layer specific ranking of neurons 312 in the DNN 302.

The neuron ranking module 310 is configured to rank neurons based on their importance in performing DNN tasks by evaluating the accuracy of the DNN 302 using a validation set of data, evaluating the activation function for the neurons, and determining an accuracy threshold setting for DNN 304 (operation 314). The neuron ranking module 310 is also configured to rank neurons based on their importance in performing DNN tasks by analyzing, using the validation set of data for one or more of the plurality of hidden layers, the activation function for each neuron in the analyzed one or more layers (operation 316) to determine an activation score for each neuron corresponding to an analyzed activation function. Based on the neuron activation scores, the neuron ranking module 310 is configured to rank, on a layer type basis, each neuron in the analyzed one or more layers to generate the layer specific ranking of neurons 312, wherein the ranking is performed by generating a normalized neuron activation output score for each neuron and ranking the neurons in a layer based on its normalized activation output score.

After generating a layer specific ranking of neurons, the processing system 306, via a neuron elimination selection module 318 is configured to select a number of lower ranked neurons from the DNN 302 for removal that does not result in the accuracy of the lean DNN 304 falling outside of an accuracy threshold limit. The example neuron elimination selection module 318 is configured to perform the selection iteratively. The neuron elimination selection module 318 is configured to select for removal a number of lower ranked neurons from the DNN 302 (operation 320) and perform an accuracy analysis (operation 322) to ensure that the removal of neurons does not result in the accuracy of the lean DNN 304 falling outside of an accuracy threshold limit. The removal of neurons and the accuracy check is performed iteratively to allow the example neuron elimination selection module 318 to remove just enough neurons to stay within the accuracy threshold limit.

The lean DNN 304 may be used to perform tasks for which the original DNN 302 was trained to perform, such as perception tasks in a vehicle. The lean DNN 304 may also be retrained using the training set used to train the DNN 302 to perform tasks for which the DNN 302 was trained to perform.

Figure 4:
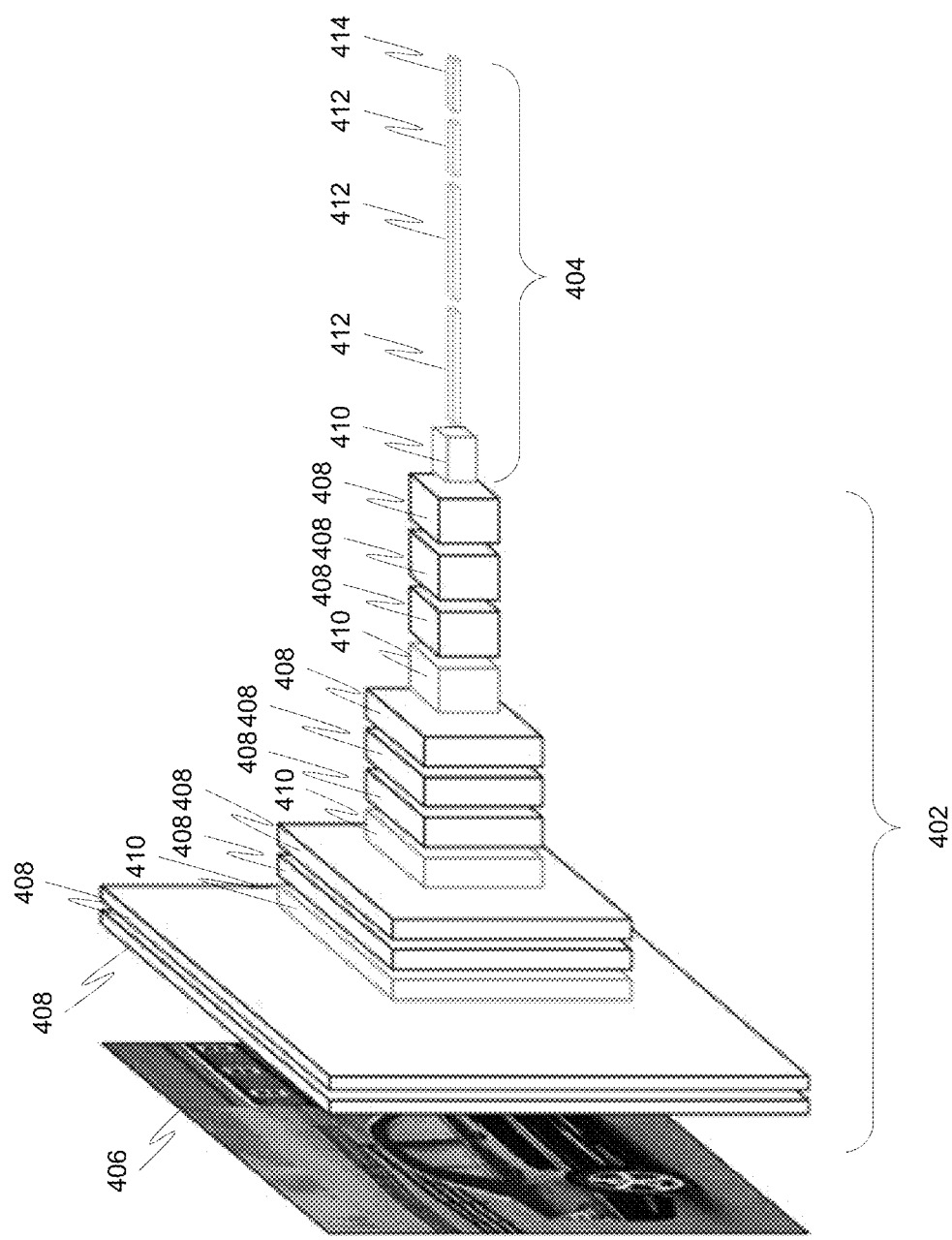
FIG. 4 is a block diagram depicting example layers in an example DNN, in accordance with some embodiments.

FIG. 4 is a block diagram depicting example layers in an example DNN 400. The example DNN 400 may be used in a vehicle perception system and includes a feature map generator module comprising feature extraction layers 402 and a classification module comprising classification layers 404. The example layer classification module 308 is configured to identify and classify layer types in a plurality of hidden layers of a DNN such as DNN 400.

The example feature extraction layers 402 generate a feature map based on sensor data 406, which in this example, includes image data provided from one or more image or ranging systems (e.g., camera, lidar and/or radar systems). The feature map is a machine-readable representation of the environment captured by the sensor data 406. The feature map includes features of the environment acquired via the sensor system at any given instant.

The example feature extraction layers 402 include a stack of distinct layers that transform the input volume into an output volume through a differentiable function using convolutional layers 408 and max-pooling layers 410. The convolutional layers 408 apply a convolution operation to their input, passing the result to the next layer. The convolution emulates the response of an individual neuron to visual stimuli. The max pooling layers 410 are inserted between convolutional layers and perform non-linear downsampling.

The example classification layers 404 classify objects from the feature map generated by the feature extraction layers 402 and include fully connected layers 412. The fully connected layers 412 connect every neuron in one layer to every neuron in another layer. The example classification layers 404 terminate with a SoftMax layer 414.

Referring back to FIG. 3, the neuron ranking module 310 performs a number of operations in preparation of ranking neurons. The neuron ranking module 310 is configured to evaluate the accuracy of the original trained DNN 302. To evaluate the accuracy of the trained DNN 302, the neuron ranking module 310 is configured to run a complete validation set of data through the trained DNN 302 and determine its prediction accuracy. For example, as depicted in Table 1 below, determining a prediction accuracy may involve determining the prediction accuracy of the DNN with respect to its Top 5 predictions (e.g., determining the percentage at which the actual object is one of the five more likely candidate items identified by the DNN) for an input and determining the prediction accuracy of the DNN with respect to its Top 1 prediction (e.g., determining the percentage at which the actual object is the most likely candidate item identified by the DNN).

TABLE 1

| DNN model | Top-5 | Top-1 |
|---|---|---|
| VGG16 | 86% | 66% |
| VGG19 | 91% | 72% |
| MobileNet | 87% | 66% |
| DenseNet | 93% | 77% |

The neuron ranking module 310 is configured to identify an acceptable accuracy threshold compromise for the lean DNN 304. As an example, an acceptable accuracy threshold compromise may equal five percent (5%)—It may determine that for the specific application of the DNN 304, that a reduction in accuracy by five percent may be acceptable for the DNN 304 to achieve reduced computational power requirements. The accuracy threshold should be determined by expert decision and application specific.

Figure 5:
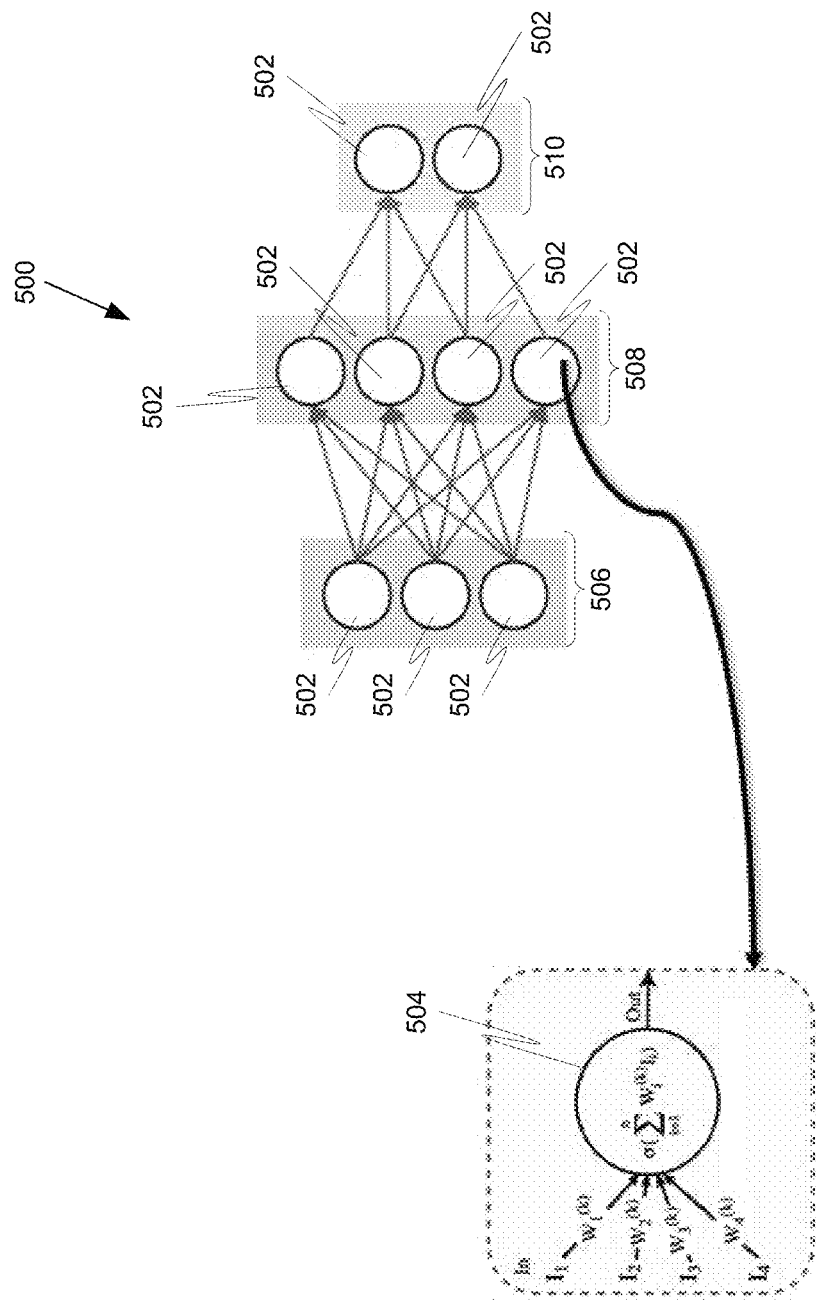
FIG. 5 is a diagram illustrating example components of an example DNN, in accordance with some embodiments.

The neuron ranking module 310 is further configured to evaluate the activation function for the neurons. FIG. 5 is a diagram illustrating example components of an example DNN 500. The example DNN 500 is organized in layers that are made up of a number of interconnected neurons 502. Each neuron 502 includes an activation function 504. Patterns are presented to the network via an input layer 506, which communicates to one or more hidden layers 508 where the actual processing is done via a system of weighted connections. The activation function 504 identifies weights that are applied to inputs to the associated neuron to generate an output. The hidden layers 508 then link to an output layer 510 where an output is generated.

The neuron ranking module 310 is also configured to perform layer specific activation function analysis for neurons. The neuron ranking module 310 is configured to analyze, using the validation set of data for one or more of the plurality of hidden layers, the activation function for each neuron in the analyzed one or more layers to determine an activation score for each neuron corresponding to its analyzed activation function.

Figure 6:
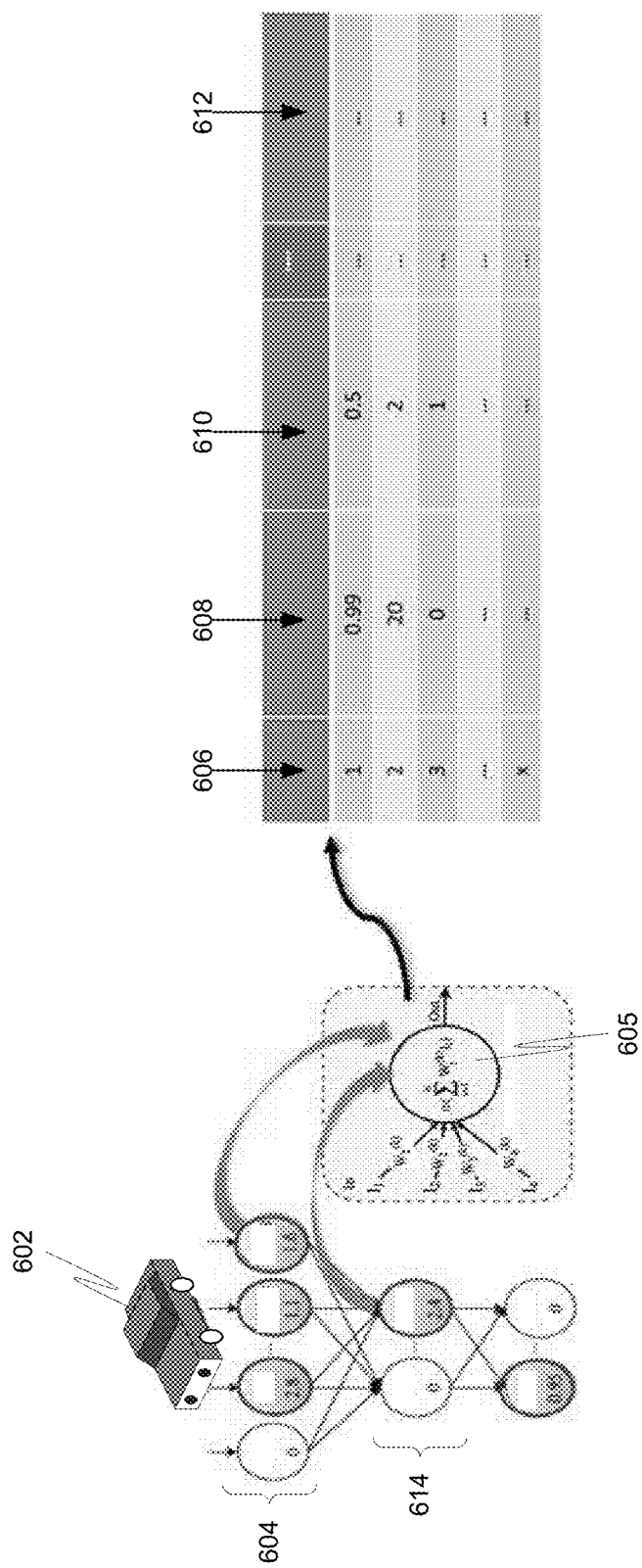
FIG. 6 is a diagram illustrating example evaluation and recording of activation function output for neurons, in accordance with some embodiments.

FIG. 6 is a diagram illustrating example evaluation and recording of activation function output for neurons. In this example, the effect of input 602 applied at an input layer (not shown) is applied to a first hidden layer 604. Each neuron in the first hidden layer 604 has an activation function 605 and the activation function 605 generates a score based on the input 602. A neuron identification 606 is recorded for the neuron, as well as a neuron activation output 608 for the input 602. Neuron activation outputs 610-612 are also recorded for the neuron based on different inputs from the validation set of data. The neuron identification 606 and neuron activation outputs 608, 610-612 for other neurons, such as for neurons in the second hidden layer 614 are also recorded.

Based on the neuron activation scores, the neuron ranking module 310 is configured to rank, on a layer type basis, each neuron in the analyzed one or more layers to generate the layer specific ranking of neurons 312. The ranking is performed by generating a maximum of the normalized neuron activation output score for each neuron and ranking the neurons in a layer based on its normalized activation output score. The normalized activation output score may be generated in accordance with the following formula:

$$\text{Normalized Activation Output}(Nx) = \frac{\text{Activation Output in}(Nx)}{\text{Max}(\text{Activation Output}(Nx)}.$$

The neuron ranking module 310 may rank neurons in other layers such as convolutional layers separately in a similar fashion.

Referring again to FIG. 3, the example neuron elimination selection module 318 is configured to select a number of lower ranked neurons from the DNN 302 for removal that does not result in the accuracy of the lean DNN 304 falling outside of an accuracy threshold limit. The example neuron elimination selection module 318 is configured to perform the selection iteratively. The neuron elimination selection module 318 is configured to select for removal a number of lower ranked neurons from the DNN 302 (operation 320) and perform an accuracy analysis (operation 322) to ensure that the removal of neurons does not result in the accuracy of the lean DNN 304 falling outside of an accuracy threshold limit. The removal of neurons and the accuracy check is performed iteratively to allow the example neuron elimination selection module 318 to remove just enough neurons to stay within the accuracy threshold limit.

Figure 7:
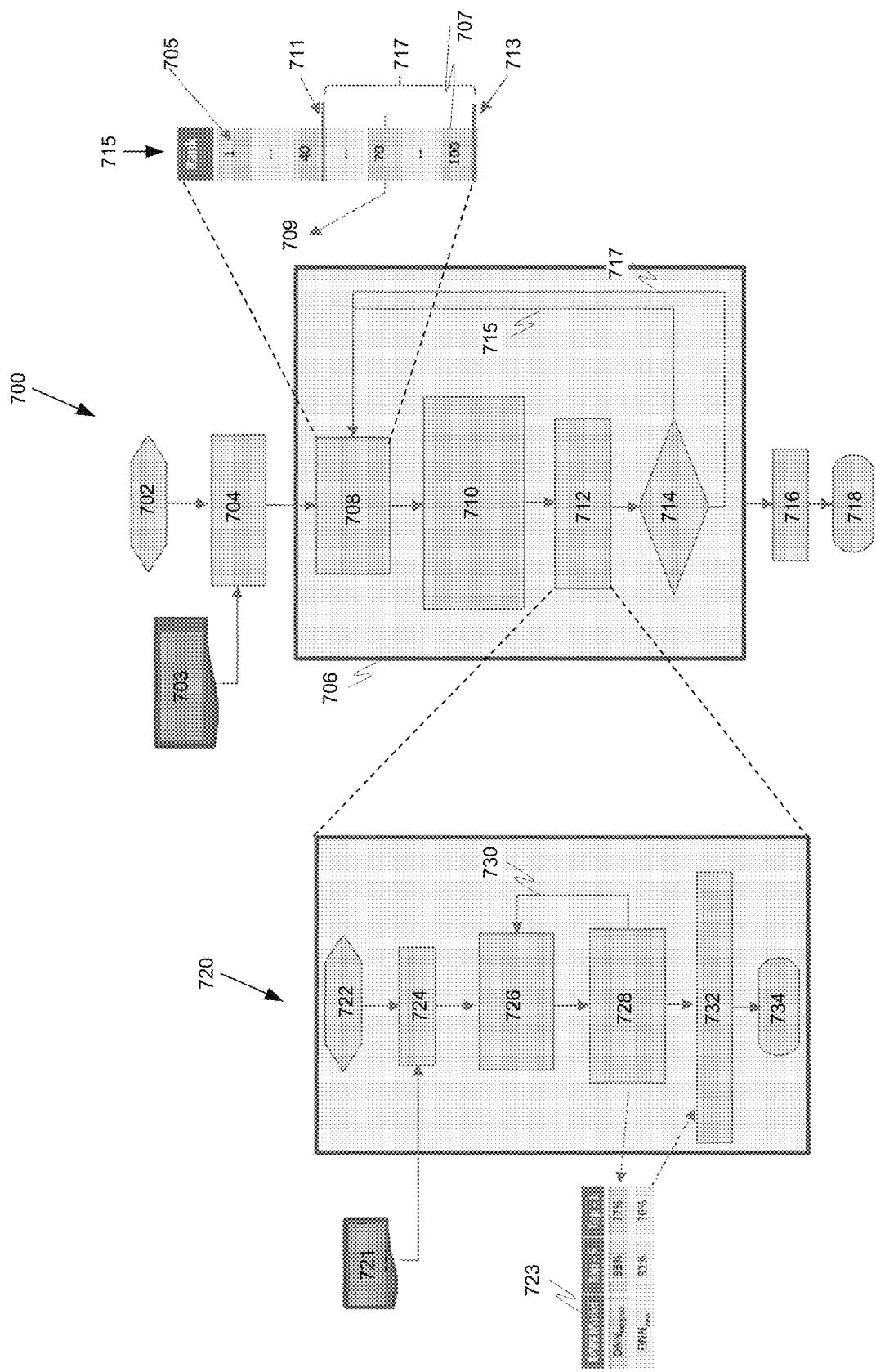
FIG. 7 is a process flow chart depicting an example process for iteratively selecting neurons for elimination from a trained DNN to generate a lean DNN, in accordance with some embodiments.

FIG. 7 is a process flow chart depicting an example process 700 for iteratively selecting neurons for elimination from the original trained DNN 302 to generate a lean DNN 304 and for checking the accuracy of the lean DNN 304 after each iterative step.

After the start (operation 702) of example process 700, a reduction limit 703 (e.g., 40%) is input to set a binary search limit (operation 704) for identifying the maximum number of neurons that may be eliminated to produce a lean DNN. The example process 700 includes the performance of a preset number of iterations (20 iterations in this example) (operation 706) to determine the neurons to eliminate to produce a lean DNN. Within each iteration, the example process 700 includes a binary search of the ranking (operation 708) of neurons, wherein, in this example, a rank of 1 identifies a highly enable neuron 705 and a rank of 100 identifies the lowest enable neurons 707.

In the binary search of the ranking (operation 708), the process 700 also includes calculating half of the interval rank. The half interval rank 709 can be determined by identifying the lower limit 711 and an upper limit 713 of the neuron ranking 715. The neurons in between the lower limit 711 and an upper limit 713 of the neuron ranking 715 are the neurons within the neuron reduction limit 717.

After calculating half of the interval rank, the example process includes setting as a new DNN (e.g., $DNN_{new}$), the active DNN (e.g., $DNN_{act}$) wherein a traversal of $DNN_{act}$ is performed to eliminate Neurons $N_i$ where the Rank $(N_i)$>=Half int. Rank 709 (operation 710). In other words, the neurons with a rank equal to or higher than the neuron at the half interval rank 709 are eliminated from the DNN to form a new DNN. After neuron elimination, an accuracy evaluation of $DNN_{new}$ is performed (operation 712).

The accuracy evaluation is depicted in subprocess 720. After the start (722) of subprocess 720, a validation set 721 of data is input and read by $DNN_{new}$ (operation 724). The example subprocess 720 includes executing the DNN with the input E validation set (operation 726) and analyzing the results of the execution and aggregating the accuracy (operation 728). Data regarding the accuracy of $DNN_{new}$ may be aggregated in a table 723 which can show the accuracy of the $DNN_{original}$ and the accuracy of $DNN_{new}$. The example subprocess 720 may include all inputs as elements of the validation set (operation 730). The example subprocess 720 includes setting as an output the difference between the accuracy of the original DNN and the accuracy of the $DNN_{new}$ (operation 732). The example subprocess 720 may then stop (operation 734).

After performance of accuracy evaluation, a determination is made regarding whether the accuracy drop between $DNN_{new}$ and $DNN_{original}$ is less than 5% (decision 714). 5% is the accuracy threshold that has been set in this example. If the accuracy drop is less than 5% (yes at decision 714), then the Upper limit 713 for the next iteration is set at the half interval rank 709 from the last iteration and the $DNN_{act}$ for the next iteration is set to be equal to the $DNN_{new}$ for the last iteration and a new iteration is begun with operation 708 (operation 715). If the accuracy drop is not less than 5% (no at decision 714), then the Lower limit 711 for the next iteration is set at the half interval rank 709 from the last iteration and a new iteration is begun with operation 708 (operation 717).

After completion of the preset number of iterations (e.g., 20), operation 706 concludes and the $DNN_{act}$ for the last iteration is output as the lean DNN (operation 716). The process 700 then stops (718).

Figure 8:
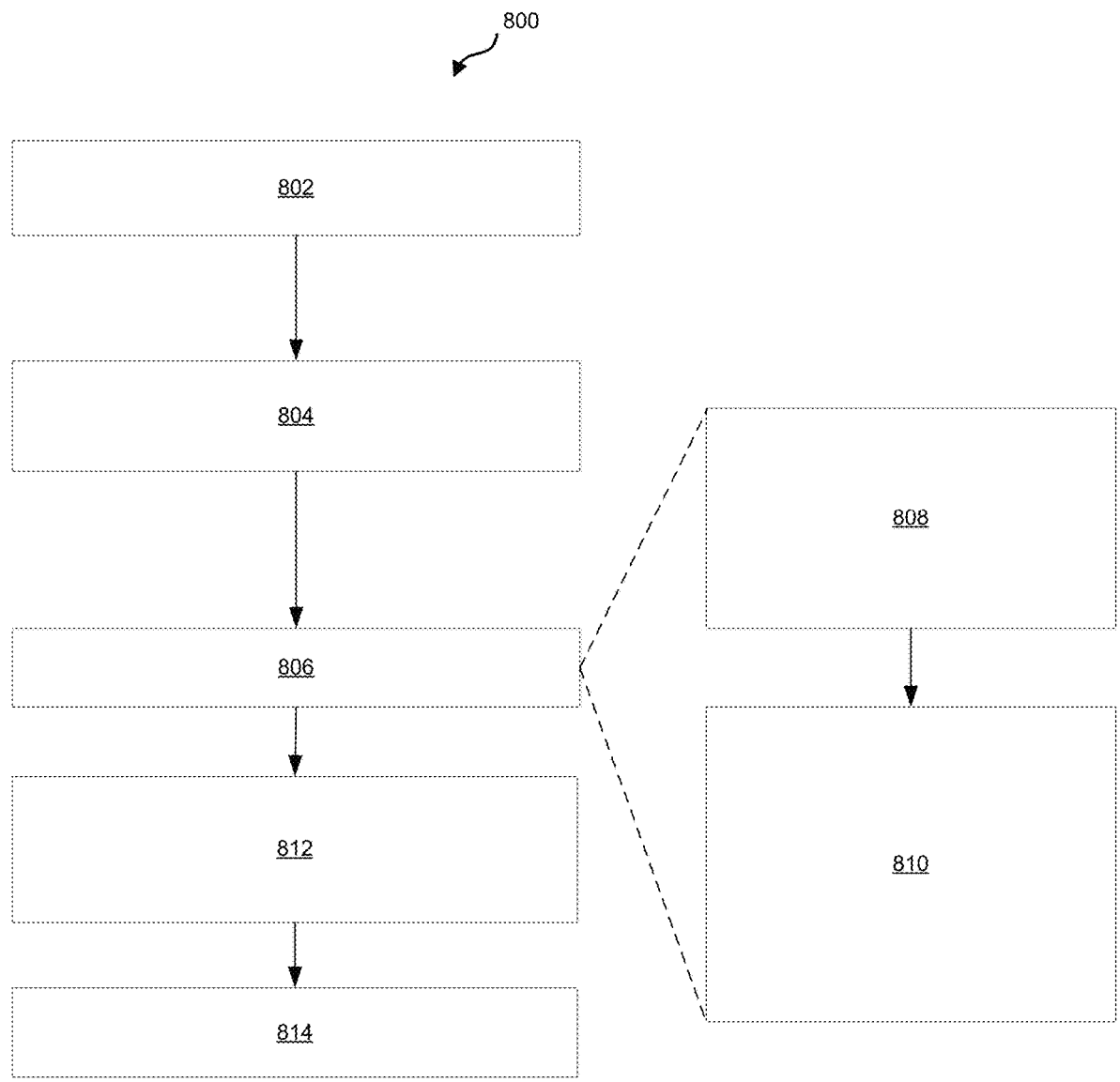
FIG. 8 is a process flow chart depicting an example processor implemented process for reducing the number of neurons in a trained DNN, in accordance with some embodiments.

FIG. 8 is a process flow chart depicting an example processor implemented process 800 for reducing the number of neurons in a trained DNN. The process 800 includes identifying and classifying layer types in a plurality of hidden layers of the DNN (operation 802). The layer types in the hidden layers may include fully connected layers and convolutional layers.

The process 800 includes evaluating the accuracy of the DNN using a validation set of data (operation 804). The evaluating the accuracy of the DNN may include applying the validation set of data to the inputs of the DNN and determining the prediction accuracy at the outputs of the DNN.

The process 800 includes generating a layer specific ranking of neurons (operation 806). The generating comprises analyzing, using the validation set of data for one or more of the plurality of hidden layers, the activation function for each neuron in the analyzed one or more layers to determine an activation score for each neuron corresponding to an analyzed activation function (operation 808). The generating further comprises ranking, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score (operation 810).

The process 800 includes selecting a number of lower ranked neurons from the DNN for removal that does not result in the DNN after the removal of selected lower ranked neurons to fall outside of an accuracy threshold limit (operation 812). The selecting a number of lower ranked neurons from the DNN for removal may include iteratively selecting lower ranked neurons from the DNN for removal until an iteration threshold is met.

The iteratively selecting lower ranked neurons from the DNN for removal may include: designating some of the lower ranked neurons for removal, comparing the accuracy of a newer DNN with the lower ranked neurons designated for removal removed to the DNN without neurons removed, and when the accuracy of the newer DNN is not within accuracy threshold limits, performing another iteration of the selecting while designating fewer neurons for removal if an iteration limit has not been met or selecting for removal the neurons designated for removal from the latest prior iteration wherein the accuracy of the newer DNN was within accuracy threshold limits if the iteration limit has been met, and when the accuracy of the newer DNN is within accuracy threshold limits, performing another iteration of the selecting while designating more neurons for removal if an iteration limit has not been met or selecting for removal the neurons designated for removal in the current iteration if the iteration limit has been met.

Designating some of the lower ranked neurons for removal may include identifying the lowest ranked neurons that fall within a predetermined neuron reduction limit and designating for elimination neurons in the lowest ranked neurons that fall within the predetermined neuron reduction limit. Designating some of the lower ranked neurons for removal may include identifying the lowest ranked neurons that fall within a predetermined neuron reduction limit and designating for elimination neurons in the lower half of the lowest ranked neurons that fall within the predetermined neuron reduction limit. Designating some of the lower ranked neurons for removal may include only designating neurons in fully connected layers for removal.

Comparing the accuracy of the newer DNN to the DNN without neurons removed may include determining the accuracy of the newer DNN by applying the validation set of data to the inputs of the newer DNN and determining the prediction accuracy at the outputs of the newer DNN. The process 800 may include determining whether the accuracy of the newer DNN is within threshold limits by comparing the prediction accuracy at the outputs of the newer DNN to the prediction accuracy at the outputs of the DNN without neurons removed. Determining the prediction accuracy at the outputs of the DNN may include determining the prediction accuracy of the top-1 prediction at the outputs of the DNN and the prediction accuracy of the top-5 predictions at the outputs of the DNN.

The process 800 includes removing the neurons selected for removal from the DNN (operation 814) to generate a lean DNN. The lean DNN generated from performing the process 800 can be used to perform perception tasks in a vehicle. The process 800 may further include retraining the DNN with the removed neurons using a data training set used to train the DNN before the removal of neurons.

Referring back to FIG. 3, to select a number of lower ranked neurons from the DNN for removal the example neuron elimination selection module 318 may be configured to iteratively select lower ranked neurons from the DNN for removal until an iteration threshold is met. To iteratively select lower ranked neurons from the DNN for removal the example neuron elimination selection module 318 may be configured to: designate some of the lower ranked neurons for removal, compare the accuracy of a newer DNN with the lower ranked neurons designated for removal removed to the DNN without neurons removed, and when the accuracy of the newer DNN is not within accuracy threshold limits, perform another iteration of the selecting while designating fewer neurons for removal if an iteration limit has not been met or select for removal the neurons designated for removal from the latest prior iteration wherein the accuracy of the newer DNN was within accuracy threshold limits if the iteration limit has been met, and when the accuracy of the newer DNN is within accuracy threshold limits, perform another iteration of the selecting while designating more neurons for removal if an iteration limit has not been met or select for removal the neurons designated for removal in the current iteration if the iteration limit has been met.

To evaluate the accuracy of the DNN the example neuron elimination selection module 318 may be configured to apply the validation set of data to the inputs of the DNN and determine the prediction accuracy at the outputs of the DNN. To compare the accuracy of the newer DNN to the DNN without neurons removed the example neuron elimination selection module 318 may be configured to determine the accuracy of the newer DNN by applying the validation set of data to the inputs of the newer DNN and determining the prediction accuracy at the outputs of the newer DNN. The example neuron elimination selection module 318 may be configured to determine whether the accuracy of the newer DNN is within threshold limits by comparing the prediction accuracy at the outputs of the newer DNN to the prediction accuracy at the outputs of the DNN without neurons removed. To determine the prediction accuracy at the outputs of the DNN the example neuron elimination selection module 318 may be configured to determine the prediction accuracy of the top-1 prediction at the outputs of the DNN and the prediction accuracy of the top-5 predictions at the outputs of the DNN.

To designate some of the lower ranked neurons for removal the example neuron elimination selection module 318 may be configured to identify the lowest ranked neurons that fall within a predetermined neuron reduction limit and designate for elimination neurons in the lowest ranked neurons that fall within the predetermined neuron reduction limit. To designate some of the lower ranked neurons for removal the example neuron elimination selection module 318 may be configured to identify the lowest ranked neurons that fall within a predetermined neuron reduction limit and designate for elimination neurons in the lower half of the lowest ranked neurons that fall within the predetermined neuron reduction limit. To designate some of the lower ranked neurons for removal the example neuron elimination selection module 318 may be configured to only designate neurons in fully connected layers for removal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method for reducing the number of neurons and their interconnections in a trained deep neural network (DNN) used in a vehicle, the method comprising:
   identifying and classifying layer types in a plurality of hidden layers of the DNN;
   evaluating the accuracy of the DNN using a validation set of data;
   generating a layer specific ranking of neurons, the generating comprising:
      analyzing, using the validation set of data for one or more of the plurality of hidden layers, an activation function for each neuron in the analyzed one or more layers to determine an activation score for each neuron corresponding to an analyzed activation function; and
      ranking, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score;
   selecting a number of lower ranked neurons of a specific type from the DNN for removal that does not result in the DNN after the removal of selected lower ranked neurons to fall outside of an accuracy threshold limit, the selecting a number of lower ranked neurons from the DNN for removal comprising iteratively analyzing and selecting lower ranked neurons from the DNN for removal until an iteration threshold is met, the iteratively selecting lower ranked neurons from the DNN for removal comprising:
      designating some of the lower ranked neurons for removal;
      comparing the accuracy of a newer DNN with the lower ranked neurons designated for removal removed to the DNN without neurons removed;
      when the accuracy of the newer DNN is not within accuracy threshold limits, performing another iteration of the selecting while designating fewer neurons for removal if an iteration limit has not been met or selecting for removal the neurons designated for removal from the latest prior iteration wherein the accuracy of the newer DNN was within accuracy threshold limits if the iteration limit has been met; and
      when the accuracy of the newer DNN is within accuracy threshold limits, performing another iteration of the selecting while designating more neurons for removal if an iteration limit has not been met or selecting for removal the neurons designated for removal in the current iteration if the iteration limit has been met; and
   removing the neurons selected for removal from the DNN;
   wherein the DNN with the removed neurons is configured to be used to perform perception tasks in a vehicle.

2. The method of claim 1, wherein the layer types in the hidden layers comprise fully connected layers and convolutional layers.

3. The method of claim 1, wherein evaluating the accuracy of the DNN comprises applying the validation set of data to inputs of the DNN and determining a prediction accuracy at the outputs of the DNN.

4. The method of claim 3, wherein comparing the accuracy of the newer DNN to the DNN without neurons removed comprises determining the accuracy of the newer DNN by applying the validation set of data to the inputs of the newer DNN and determining a prediction accuracy at the outputs of the newer DNN.

5. The method of claim 4, comprising determining whether the accuracy of the newer DNN is within threshold limits by comparing the prediction accuracy at the outputs of the newer DNN to the prediction accuracy at the outputs of the DNN without neurons removed.

6. The method of claim 3, wherein determining the prediction accuracy at the outputs of the DNN comprises determining a prediction accuracy of a top-1 prediction at the outputs of the DNN and a prediction accuracy of a top-5 predictions at the outputs of the DNN.

7. The method of claim 1, wherein the designating some of the lower ranked neurons for removal comprises identifying the lowest ranked neurons that fall within a predetermined neuron reduction limit and designating for elimination neurons in the lowest ranked neurons that fall within the predetermined neuron reduction limit.

8. The method of claim 1, wherein the designating some of the lower ranked neurons for removal comprises identifying the lowest ranked neurons that fall within a predetermined neuron reduction limit and designating for elimination neurons in the lower half of the lowest ranked neurons that fall within the predetermined neuron reduction limit.

9. The method of claim 1, wherein the designating some of the lower ranked neurons for removal comprises only designating neurons in fully connected layers for removal.

10. The method of claim 1, further comprising retraining the DNN with the removed neurons using a data training set used to train the DNN before the removal of neurons.

11. A vehicle perception system comprising one or more processors configured by programming instructions on non-transitory computer readable media to implement a trained deep neural network (DNN) with removed neurons, the DNN configured by a processing system configured to:
   identify and classify layer types in a plurality of hidden layers of the DNN;
   evaluate the accuracy of the DNN using a validation set of data;
   generate a layer specific ranking of neurons, to generate the processing system is configured to:
      analyze, using the validation set of data for one or more of the plurality of hidden layers, an activation function for each neuron in the analyzed one or more layers to determine an activation score for each neuron corresponding to an analyzed activation function; and
      rank, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score;
   select a number of lower ranked neurons from the DNN for removal that does not result in the DNN after the removal of selected lower ranked neurons to fall outside of an accuracy threshold limit, wherein to select a number of lower ranked neurons from the DNN for removal the processing system is configured to iteratively select lower ranked neurons from the DNN for removal until an iteration threshold is met, wherein to iteratively select lower ranked neurons from the DNN for removal the processing system is configured to:

designate some of the lower ranked neurons for removal;

compare the accuracy of a newer DNN with the lower ranked neurons designated for removal removed to the DNN without neurons removed;

when the accuracy of the newer DNN is not within accuracy threshold limits, perform another iteration of the selecting while designating fewer neurons for removal if an iteration limit has not been met or select for removal the neurons designated for removal from the latest prior iteration wherein the accuracy of the newer DNN was within accuracy threshold limits if the iteration limit has been met; and when the accuracy of the newer DNN is within accuracy threshold limits, perform another iteration of the selecting while designating more neurons for removal if an iteration limit has not been met or select for removal the neurons designated for removal in the current iteration if the iteration limit has been met; and remove the neurons selected for removal from the DNN;

wherein the DNN with the removed neurons is configured to perform perception tasks in a vehicle.

12. The vehicle perception system of claim 11, wherein to evaluate the accuracy of the DNN the processing system is configured to apply the validation set of data to the inputs of the DNN and determine a prediction or classification accuracy at the outputs of the DNN.

13. The vehicle perception system of claim 12, wherein to compare the accuracy of the newer DNN to the DNN without neurons removed the processing system is configured to determine the accuracy of the newer DNN by applying the validation set of data to the inputs of the newer DNN and determining the prediction or classification accuracy at the outputs of the newer DNN.

14. The vehicle perception system of claim 13, wherein the processing system is configured to determine whether the accuracy of the newer DNN is within threshold limits by comparing a prediction accuracy at the outputs of the newer DNN to a prediction accuracy at the outputs of the DNN without neurons removed.

15. The vehicle perception system of claim 14, wherein to determine the prediction accuracy at the outputs of the DNN the processing system is configured to determine a prediction accuracy of a top-1 prediction at the outputs of the DNN and a prediction accuracy of a top-5 predictions at the outputs of the DNN.

16. The vehicle perception system of claim 11, wherein to designate some of the lower ranked neurons for removal the processing system is configured to identify the lowest ranked neurons that fall within a predetermined neuron reduction limit and designate for elimination neurons in the lower half of the lowest ranked neurons that fall within the predetermined neuron reduction limit.

17. The vehicle perception system of claim 11, wherein to designate some of the lower ranked neurons for removal the processing system is configured to identify the lowest ranked neurons that fall within a predetermined neuron reduction limit and designate for elimination neurons in the lowest ranked neurons that fall within the predetermined neuron reduction limit.

18. The vehicle perception system of claim 11, wherein to designate some of the lower ranked neurons for removal the processing system is configured to only designate neurons in fully connected layers for removal.

19. The vehicle perception system of claim 11, wherein the processing system is further configured to retrain the DNN with the removed neurons using a data training set used to train the DNN before the removal of neurons.

20. A processing system comprising one or processors configured by programming instructions on non-transitory computer readable media to reduce the number of neurons in a trained deep neural network (DNN), the processing system configured to:

identify and classify layer types in a plurality of hidden layers of the DNN;

evaluate the accuracy of the DNN using a validation set of data;

generate a layer specific ranking of neurons, to generate the processing system is configured to:

analyze, using the validation set of data for one or more of the plurality of hidden layers, an activation function for each neuron in the analyzed one or more layers to determine an activation score for each neuron corresponding to an analyzed activation function; and rank, on a layer type basis, each neuron in the analyzed one or more layers based on the activation score for the neuron to generate a layer specific ranking of neurons, the ranking including generating a normalized neuron activation output score for each neuron and ranking the neurons in a layer based on its normalized activation output score;

select a number of lower ranked neurons from the DNN for removal that does not result in the DNN after the removal of selected lower ranked neurons to fall outside of an accuracy threshold limit, wherein to select a number of lower ranked neurons from the DNN for removal the processing system is configured to iteratively select lower ranked neurons from the DNN for removal until an iteration threshold is met, wherein to iteratively select lower ranked neurons from the DNN for removal the processing system is configured to:

designate some of the lower ranked neurons for removal;

compare the accuracy of a newer DNN with the lower ranked neurons designated for removal removed to the DNN without neurons removed;

when the accuracy of the newer DNN is not within accuracy threshold limits, perform another iteration of the selecting while designating fewer neurons for removal if an iteration limit has not been met or select for removal the neurons designated for removal from the latest prior iteration wherein the accuracy of the newer DNN was within accuracy threshold limits if the iteration limit has been met; and when the accuracy of the newer DNN is within accuracy threshold limits, perform another iteration of the selecting while designating more neurons for removal if an iteration limit has not been met or select for removal the neurons designated for removal in the current iteration if the iteration limit has been met; and remove the neurons selected for removal from the DNN;

wherein the DNN with the removed neurons is configured to perform perception tasks in a vehicle.

* * * * *